US012726427B2

(12) United States Patent
Patel et al.

(10) Patent No.: US 12,726,427 B2
(45) Date of Patent: Sep. 1, 2026

(54) CARBON FOOTPRINT-BASED ROUTING OF A PACKET

(71) Applicant: International Business Machines Corporation, Armonk, NY (US)

(72) Inventors: Kushal Sanjivkumar Patel, Pune (IN); Gandhi Sivakumar, Mountain View, CA (US); Sarvesh Sanjeev Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 18/747,952

(22) Filed: Jun. 19, 2024

(65) Prior Publication Data

US 2025/0392538 A1 Dec. 25, 2025

(51) Int. Cl.
*H04L 45/12* (2022.01)
*H04L 45/302* (2022.01)

(52) U.S. Cl.
CPC .......... *H04L 45/124* (2013.01); *H04L 45/302* (2013.01)

(58) Field of Classification Search
CPC ............................ H04L 45/124; H04L 45/302
See application file for complete search history.

(56) References Cited

U.S. PATENT DOCUMENTS 10,019,181 B2 7/2018 Singh et al.
10,140,036 B2 11/2018 Kelner et al.
2010/0030598 A1* 2/2010 Kamalakantha ............................ G06Q 10/06313 705/7.23
2014/0169169 A1* 6/2014 Almog .................... H04L 47/32 370/235
2015/0331473 A1 11/2015 Jreji et al.

(Continued)

FOREIGN PATENT DOCUMENTS

CN 116668878 A 8/2023
WO 2023014250 A1 2/2023

OTHER PUBLICATIONS

Tabaeiaghdaei et al., "Carbon-Intelligent Global Routing in Path-Aware Networks," arXix, May 1, 2023, 14 pages, retrieved from https://arxiv.org/abs/2211.00347.

(Continued)

*Primary Examiner* — Jason D Recek
(74) *Attorney, Agent, or Firm* — Stosch Sabo

(57) ABSTRACT

A computer-implemented method (CIM), according to one embodiment, includes, in response to receiving a first packet from a first application, performing a predetermined process for determining a low carbon emission transmission route along a source to a target. The predetermined process includes predicting for each of a plurality of devices between the source and the target, carbon emissions that would result from using the device for transmitting the first packet, and generating a carbon emission map. The predetermined process further includes selecting, from the carbon emission map, a first transmission route that hops along at least one of the devices, where the first transmission route is selected over a second transmission route based on the second transmission route having a greater carbon emission than the first transmission route. The CIM further includes causing the first packet to be transmitted from the source to the target along the first transmission route.

20 Claims, 7 Drawing Sheets

(56) References Cited

U.S. PATENT DOCUMENTS

| | | | |
|---|---|---|---|
| 2016/0062421 A1 | 3/2016 | Sugawara et al. | |
| 2018/0321864 A1 | 11/2018 | Benisty | |
| 2019/0082010 A1 | 3/2019 | Friedman et al. | |
| 2023/0017632 A1 | 1/2023 | Herb et al. | |
| 2024/0146639 A1* | 5/2024 | Guim Bernat | H04L 45/302 |

OTHER PUBLICATIONS

IBM, "Open Shortest Path First," IBM Documentation, Apr. 11, 2023, 4 pages, retrieved from https://www.ibm.com/docs/en/i/7.4?topic=routing-open-shortest-path-first.

Singh et al., "Carbon-Aware Routing in Software Defined Inter Data Center Network," 2015 IEEE International Conference on Advanced Networks and Telecommuncations Systems (ANTS), 2015, pp. 1-6.

Google Search, "Distributed network environments," 2024, 1 page, retrieved on Jun. 14, 2024, from https://www.google.com/search?q=Distributed+network+environments&rlz=1C1GCEU_enUS1073US1073&oq=Distributed+networ+environments&gs_lcrp=EgZjaHJvbWUyBggAEEUYOTIICAEQABgWGB4yDQgCEAAYhgMYgAQYigUyDQgDEAAYhgMYgAQYigUyDQgEEAAYhgMYgAQYigUyDQgFEAAYhgMYgAQYigUyCggGEAAYgAQYogQyCggHEAAYgAQYogQyCggIEAAYogQYiQXSAQc5MTFqMGo3qAIAsAIA&sourceid=chrome&ie=UTF-8.

* cited by examiner

COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

CARBON FOOTPRINT-BASED ROUTING CODE

150

PERIPHERAL DEVICE SET 114

UI DEVICE SET 123

STORAGE 124

IoT SENSOR SET 125

NETWORK MODULE 115

END USER DEVICE 103

WAN 102

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

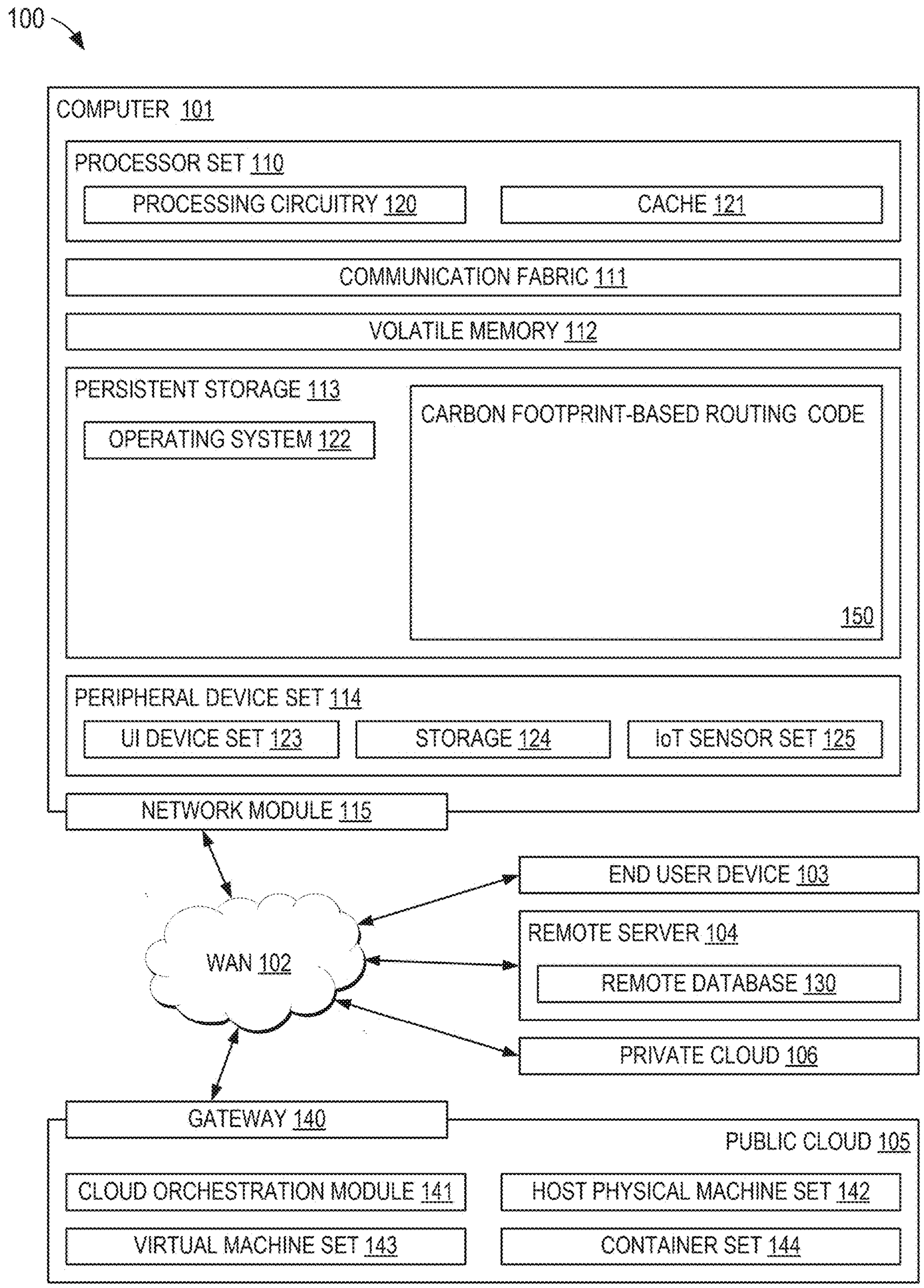

FIG. 1

CARBON FOOTPRINT-BASED ROUTING OF A PACKET

BACKGROUND

The present invention relates to transmission of packets, and more specifically, this invention relates to transmission paths used for the transmission of packets.

Distributed network environments include a plurality of devices, e.g., laptop computers, desktop computer, cellular phones, etc., that that may selectively work together to accomplish a task. These devices may be physically and/or wirelessly connected with one another. Moreover, in some distributed network environments, at least some of these devices may be located at the same geographic location, while in some other distributed network environments, one or more of these devices may be located at different geographic locations. An illustrative example of a task that may be performed by a plurality of tasks in a distributed network environment includes the transmission of a packet, e.g., a packet of data, from a source to a target, where the transmission is performed by one or more of the devices.

SUMMARY

A computer-implemented method (CIM), according to one embodiment, includes, in response to receiving a first packet from a first application, performing a predetermined process for determining a relatively low carbon emission transmission route for the first packet along a source to a target. The predetermined process includes predicting for each of a plurality of devices between the source and the target, carbon emissions that would result from using the device for transmitting the first packet, and generating a carbon emission map that incorporates the predicted carbon emissions. The predetermined process further includes selecting, from the carbon emission map, a first transmission route for the first packet, where the first transmission route hops along at least one of the devices, and where the first transmission route is selected over a second transmission route for the first packet based on the second transmission route having a relatively greater carbon emission than the first transmission route. The CIM further includes causing the first packet to be transmitted from the source to the target along the first transmission route.

A computer program product (CPP), according to another embodiment, includes a set of one or more computer-readable storage media, and program instructions, collectively stored in the set of one or more storage media, for causing a processor set to perform the foregoing method.

A computer system (CS), according to another embodiment, includes a processor set, a set of one or more computer-readable storage media, and program instructions, collectively stored in the set of one or more storage media, for causing the processor set to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

DETAILED DESCRIPTION

Figure 2A:
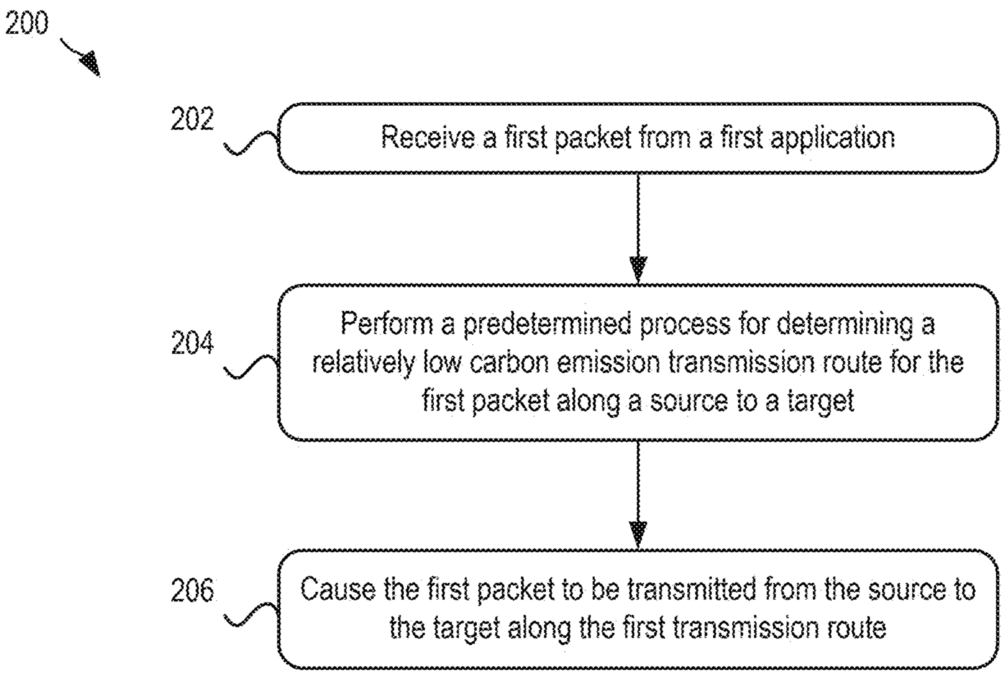
FIG. 2A is a flowchart of a method, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for carbon footprint-based routing of a packet.

In one general embodiment, a CIM includes, in response to receiving a first packet from a first application, performing a predetermined process for determining a relatively low carbon emission transmission route for the first packet along a source to a target. The predetermined process includes predicting for each of a plurality of devices between the source and the target, carbon emissions that would result from using the device for transmitting the first packet, and generating a carbon emission map that incorporates the predicted carbon emissions. The predetermined process further includes selecting, from the carbon emission map, a first transmission route for the first packet, where the first transmission route hops along at least one of the devices, and where the first transmission route is selected over a second transmission route for the first packet based on the second transmission route having a relatively greater carbon emission than the first transmission route. The CIM further includes causing the first packet to be transmitted from the source to the target along the first transmission route.

In another general embodiment, a CPP includes a set of one or more computer-readable storage media, and program instructions, collectively stored in the set of one or more storage media, for causing a processor set to perform the foregoing method.

In another general embodiment, a CS includes a processor set, a set of one or more computer-readable storage media, and program instructions, collectively stored in the set of one or more storage media, for causing the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as carbon footprint-based routing code of block 150 for determining how to route a packet. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

A list of terms used in the descriptions herein and their definitions is provided below.

Carbon emission map (also referred to herein as open max sustainability (OMSM)): A map of source to target routes with determined weightages based on the respective carbon emission footprints. To incorporated comparative weightage if <location x, device A> is drawing "n" carbon emission per second, and <location y, device B> is "n1", generation of the map makes the weightage arrangement to indicate which path is taking less, and the indications may be used in a determination of which path a packet is to take.

Non-functional requirements (NFRs): The quality of service requirements for application workload, which may be decoded from priority flow control (PFC) and class of service (CoS) values coming from incoming packets.

Priority Code Point (PCP): Used to classify and manage network traffic and providing QoS in Layer 2 Ethernet networks. The PCP uses a 3-bit PCP field in a VLAN header for packet classification.

Dynamic super-activity identification: Identification of a pattern of packet transmission workload on a specific networked device. This pattern is monitored and plotted to locate which path is over/underutilized based on past observations.

State change notification (SCN) and Response state change notification (RSCN): The proactive and reactive approaches where a target sends data based on defined policies. In case of SCN, when any config/hardware/software event is generated, a proactive notification is initiated to other peers to obtain their knowledgebase of updates and vice versa.

As mentioned elsewhere above, distributed network environments include a plurality of devices, e.g., laptop computers, desktop computer, cellular phones, etc., that that may selectively work together to accomplish a task. These devices may be physically and/or wirelessly connected with one another. Moreover, in some distributed network environments, at least some of these devices may be located at the same geographic location, while in some other distributed network environments, one or more of these devices may be located at different geographic locations. An illustrative example of a task that may be performed by a plurality of tasks in a distributed network environment includes the transmission of a packet, e.g., a packet of data, from a source to a target, where the transmission is performed by one or more of the devices.

In the relatively broad sense, sustainability refers to the ability to maintain or support a process continuously over time. In business and policy contexts, sustainability seeks to prevent the depletion of natural or physical resources, so that they will remain available for the long term. Accordingly, sustainable policies emphasize the future effect of any given policy or business practice on humans, ecosystems, and the wider economy. The concept often corresponds to the belief that without major changes to the way the planet is run, the planet will suffer irreparable damage. In order to prevent this irreparable damage, within the technical field of networking, and more specifically the transmission of packets throughout a network, the techniques of embodiments and approaches described herein enable a reduction of carbon emissions during the transmission of packets from a source to a target in a network.

Now referring to FIG. 2A, a flowchart of a method 200 is shown according to one embodiment. The method 200 may be performed in accordance with aspects of the present invention in any of the environments depicted in FIGS. 1-6, among others, in various embodiments. Of course, more or fewer operations than those specifically described in FIG. 2A may be included in method 200, as would be understood by one of skill in the art upon reading the present descriptions.

Each of the steps of the method 200 may be performed by any suitable component of the operating environment. For example, in various embodiments, the method 200 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 200 may be incorporated into operations of a distributed network environment in order to relatively reduce the amount of carbon emissions that are released into Earth's atmosphere as a result of the transmission of packets throughout the distributed network environment. In some approaches, the packets are data packets that are uploaded to a server and/or data packets that are requested from such a server to a client device, e.g., a computer, via an application of a type that would become apparent to one of ordinary skill in the art after reading the descriptions herein. The operations of method 200 may, in some preferred approaches, be performed by a router that hosts an application that is used by clients to access data across a distributed network environment, and that is configured to control how packets are routed from a source to a target device in the distributed network environment. For example, as will be described below, a first packet may be received at a first router that is performing the method 200, where the router may or may not be the source. Accordingly, in some approaches, method 200 includes receiving, e.g., at the router, a first packet from a first application, e.g., see operation 202. The router may, in some approaches, include a software defined network (SDN)-based router, while in some other approaches, the router may be a hardware based router. The packet may be received and queued until a determination is made as to how the packet will be routed throughout a distributed network environment. In some approaches, in response to receiving a first packet from a first application, a predetermined process for determining a relatively low carbon emission transmission route for the first packet along a source to a target (where the source and/or target may be specified in a request from the application in some approaches) is performed, e.g., see operation 204. A relatively low carbon emission transmission route, in one approach, has a relatively lower carbon emission transmission footprint than another transmission route that could be selected for routing the packet but is estimated or computed to have a relatively higher carbon emission footprint. Illustrative approaches for performing the predetermined process are described below, e.g., see FIG. 2B.

Figure 2B:
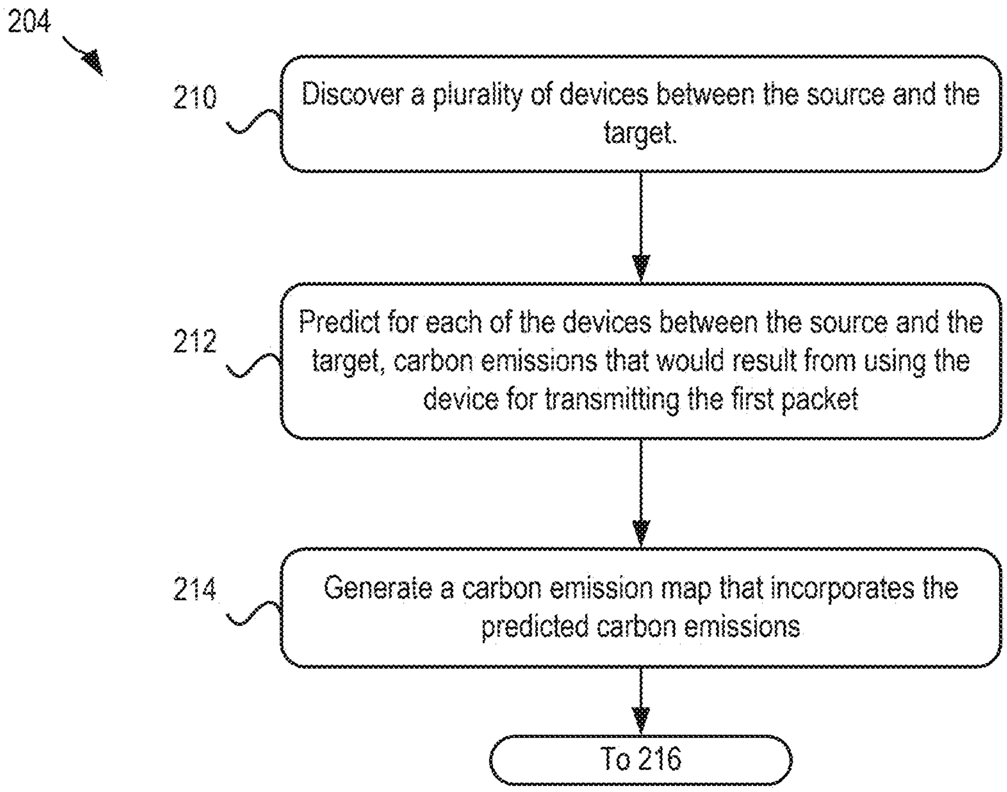
FIG. 2B is a flowchart of sub-operations of an operation of FIG. 2A, in accordance with one embodiment of the present invention.
Figure 2B:
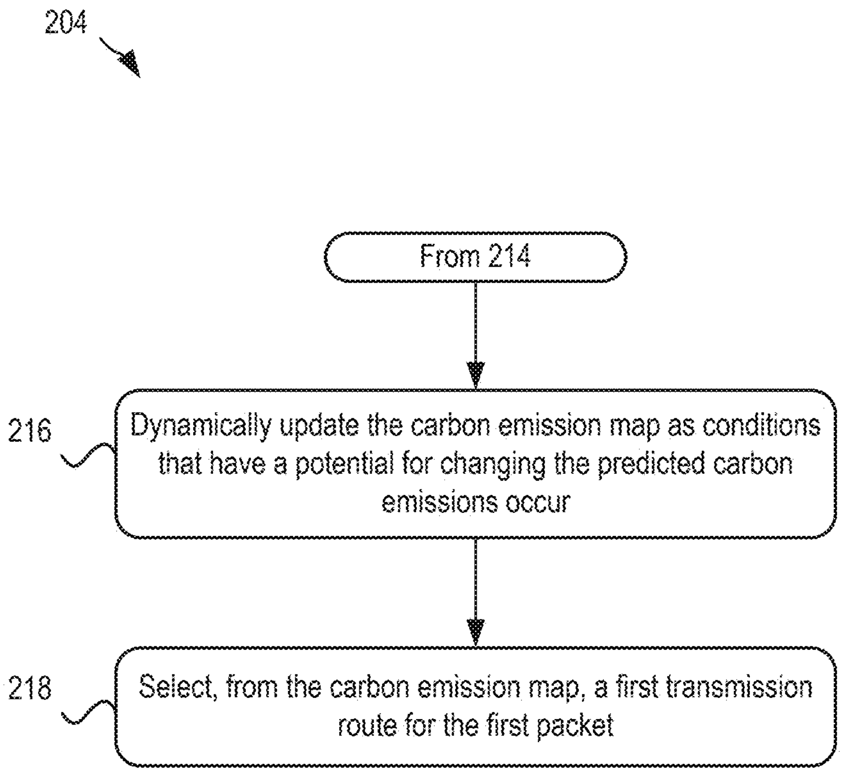

Looking to FIG. 2B, exemplary sub-operations of performing the predetermined process are illustrated in accordance with one embodiment, one or more of which may be used to perform operation 204 of FIG. 2A. However, it should be noted that the sub-operations of FIG. 2B are illustrated in accordance with one embodiment which is in no way intended to limit the invention.

The predetermined process, in some approaches, includes discovering a plurality of devices between the source and the target, e.g., see sub-operation 210. For context, these devices establish a collection of devices that may be used to transmit the first packet from the source to the target, e.g., candidate devices. In other words, in some approaches, a sub-set of the devices may be selected and used to transmit the first packet from the source to the target by causing the first packet to be hopped along the sub-set of the devices. Accordingly, the devices are preferably of a type of device that is capable of being used, e.g., instructed, to, be used for hopping a packet from a source to a target, e.g., where the device is located along a transmission path of one or more devices between the source and the target. In some approaches, the devices may include a router, a desktop computer, a laptop computer, a layer 3 router (L3 router) which may serve as both a switch and a router, a smart phone, a network switch, a server, etc.

Techniques that would become apparent to one of ordinary skill in the art after reading the descriptions herein may be used to discover the devices, e.g., querying devices regarding availability, identifying active devices in the distributed network environment, etc.

Sub-operation 212 includes predicting, for each of the discovered devices between the source and the target, carbon emissions that would result from using the device for transmitting the first packet. In some approaches, these predictions are generated based on historical data. For example, the prediction may be generated for a first device by auditing log data of the device that details historical carbon emissions for the device. Within such data, carbon emissions that correspond to the device processing a similar packet size may be determined and/or identified in order to predict a carbon emission for the device with respect to the first packet. In some approaches, a predetermined type of artificial intelligence (AI) engine may be trained on a training set of similar log data, and used to forecast the carbon emissions that use of the device to transmit the first packet would cause.

In some approaches, the predictions are based on net carbon emissions of the device. In other words, in one or more of these approaches, the predictions may incorporate carbon emission offsets of the device. For example, carbon capture and/or offsets performed by the device may include, e.g., the device being powered by natural renewal resources such as wind, solar, etc., the device capturing carbon in the atmosphere and recycling the carbon using techniques that would become apparent to one of ordinary skill in the art after reading the descriptions herein, etc. These offsets may be subtracted from the predicted amount of carbon emissions in order to determine the net carbon emissions of a given device.

A carbon emission map (also referred to herein as an open max sustainability map (OMSM)) that incorporates the predicted carbon emissions is preferably generated, e.g., see sub-operation 214. The carbon emission map may include a plurality of entries, e.g., graphical icons that each represent one of the discovered devices. The entries may additionally and/or alternatively be color coordinated according to an amount of carbon that the associated devices are predicted to output by transmitting the first packet, e.g., different predetermined ranges of predicted carbon emissions are assigned different color graphical icons within the generated carbon emission map.

It should be noted that the carbon emissions that a given one of the devices may output as a result of being used to transmit the first packet may dynamically change at any time based on one or more conditions changing. Accordingly, in order to ensure that the carbon emission map (which may be used to determine one or more devices to use for the transmission of the first packet) is accurate over time, the predetermined process, in some approaches, includes dynamically updating the carbon emission map as conditions that have a potential for changing the predicted carbon emissions occur, e.g., see sub-operation 216.

The conditions mentioned above may depend on the environment in which the device is located in. Some illustrative examples of such conditions include a change in a current weather pattern at a geographical location of one of the devices and/or a change in a predicted weather pattern at a geographical location of one of the devices. It may be noted that changes in weather patterns may impact the amount of carbon emissions that a given device releases into the atmosphere. Reasons for these changes include, e.g., relatively warmer temperatures having the potential a device needing to be cooled (which thereby causes additional carbon emissions), relatively colder temperatures having the potential a device needing to be heater (which thereby causes additional carbon emissions), periods of time with relatively less sunlight present being associated with low solar capture (which thereby reduces carbon emission offsets), etc. The conditions may additionally and/or alternatively include a predetermined amount of time passing. Furthermore, the conditions may additionally and/or alternatively be associated with device connectivity, e.g., at least one of the devices going offline, discovery of a new device, devices being scheduled for updates, etc.

Different transmission routes that extend from the source to the target along the devices, e.g., hopping along one or more of the devices, may be determined using the carbon emission map, in some approaches. These different transmission routes may be determined to establish a plurality of potential transmission routes that may be used to transmit the first packet from the source to the target.

Sub-operation 218 includes selecting, from the carbon emission map, a first transmission route for the first packet. The first transmission route for the first packet is preferably selected based on the first transmission route predicting to result in relatively less carbon emissions than other potential routes for transmitting the first packet. For example, in some approaches, the first transmission route preferably hops along at least one of the devices between the source and the target, and may be selected over a second transmission route for the first packet based on the second transmission route (determined within the carbon emission map) having a relatively greater carbon emission than the first transmission route. The carbon emission of a given one of the potential transmission routes may, in some approaches, be determined as a sum of the carbon emission values of the devices included in the given potential transmission route.

The first transmission route preferably additionally and/or alternatively is selected based on a service level agreement (SLA) that applies to the transmission of the first packet. For example, in some approaches, an optional sub-operation of the predetermined process includes identifying an SLA that applies to the transmission of the first packet. The SLA, may, in some approaches, be defined by the application from which the first packet is received from, e.g., defined in a request for transmitting the first packet. In some other approaches, the SLA is obtained by querying an owner of data included in the first packet. For context, the SLA may define a plurality of non-functional requirements (NFRs) that apply to transmission of the first packet, These NFRs may include one or more of, e.g., a maximum amount of latency, minimum transmission speeds of the first packet, security requirements for devices used to transmit the first packet, etc.

With an applicable SLA identified, in some approaches, the first transmission route is selected over the second transmission route for the first packet based on the second transmission route not satisfying the SLA that applies to the first packet and based on the first transmission route satisfying the SLA that applies to the first packet.

In some approaches, any applicable SLAs are considered to have a relatively higher priority than carbon emissions. For example, a third transmission route for the first packet may be determined to have a relatively lesser carbon emission than the first transmission route. Despite this, the first transmission route may, in some approaches, be selected over the third transmission route for the first packet based on the third transmission route not satisfying the SLA that applies to the first packet. These relative priorities of different factors used for determining a relatively low carbon emission transmission route for a packet may be dynamically changed, e.g., according to global warming reports, according to seasons throughout the year, according to change of a payment plan tier of a customer that owns data in a packet, etc.

The first transmission route preferably additionally and/or alternatively is selected based on one or more device specifications that may be noted for the first packet. For example, the first packet may specify a first of the devices that is to be used for transmitting the first packet and/or a second of the devices that are not to be used for transmitting the first packet. Accordingly, in such approaches, the first transmission route is selected based on the first transmission route including the first device and/or the first transmission route not including the second device.

With reference again to FIG. 2A, operation 206 includes causing the first packet to be transmitted from the source to the target along the first transmission route. In some approaches, instructions may be output to cause devices along the first transmission route to transmit the first packet from the source to the target along the first transmission route. These instructions may, in some approaches, include details as to how the devices are to transmit the first packet, e.g., a time of day that a given device is permitted to pass the first packet to a next hop along the first transmission route, a security protocol that a given device must adhere to while transmitting the first packet to a next hop along the first transmission route, a security encryption key that a given device must use and/or pass on in the process of transmitting the first packet to a next hop along the first transmission route, etc.

Several performance benefits are enabled within distributed network environments as a result of deployment of the techniques described herein. For example, as a result of the operations described herein being used to dynamically sense a next best transmission path to transfer packets, an overall sustainable network is established between datacenters (with respect to energy requirements and more specifically carbon emissions). Furthermore, utilization of free resources is ensured based on the identification of different device locations and availably. In other words, the overhead associated with packet transfer is distributed to location at which a device has a relatively low task load as opposed to such overhead being distributed to a location at which a device has a relatively high task load (this distribution scheme relatively reduces carbon emissions). The techniques described herein furthermore ensure relatively clean and latest components are pursued during active client connections and avoid downtime during peak periods. Proactive utilization of resources such as external atmospheric cooling and other physical characteristics of locations and external environmental factors are also considered in order to ensure that environmental factors do not cause a device used to transmit a packet to output relatively more carbon emissions than predicted. Existing resources in inactivity time windows are also leveraged for internal software grooming activities in order to ensure timely cleaning activities are incorporated into the transmission of packets. Timelines-based job completion expectations are also achieved from resource loaners.

Figure 3:
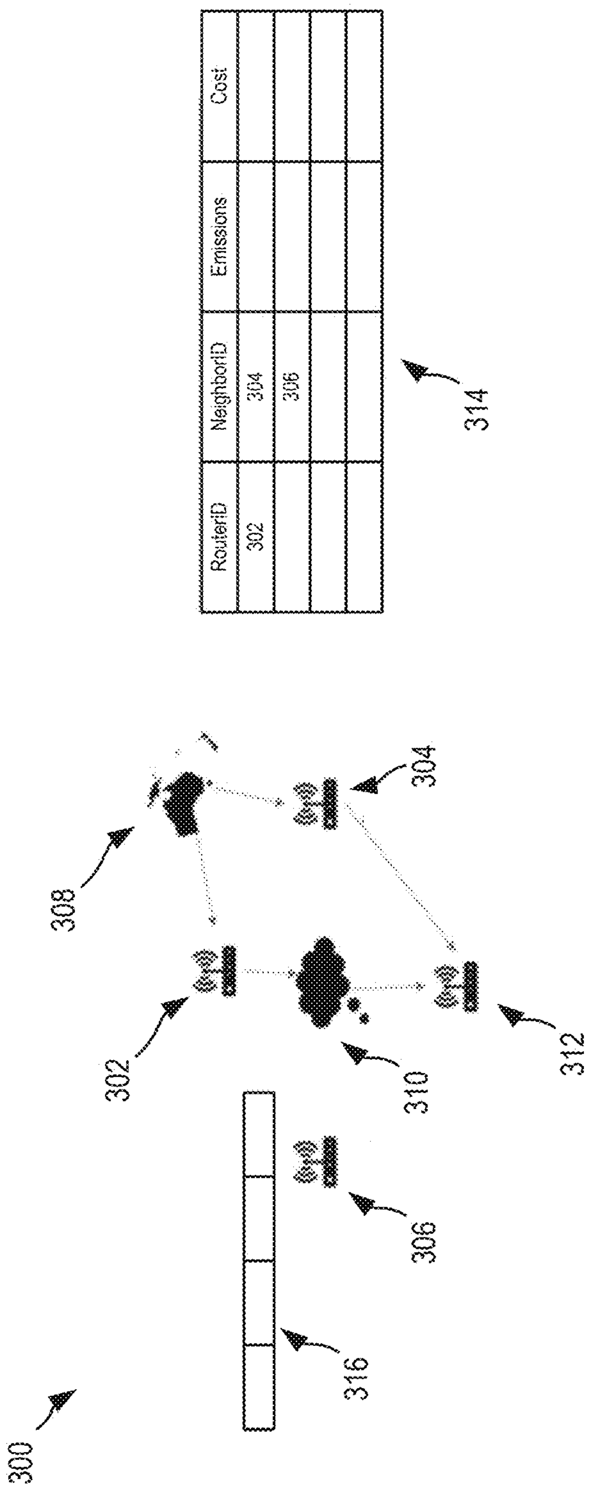
FIG. 3 is a representational view of a distributed network environment, in accordance with one embodiment of the present invention.

FIG. 3 depicts a distributed network environment 300, in accordance with one embodiment. As an option, the present distributed network environment 300 may be implemented in conjunction with features from any other embodiment listed herein, such as those described with reference to the other FIGS. Of course, however, such distributed network environment 300 and others presented herein may be used in various applications and/or in permutations which may or may not be specifically described in the illustrative embodiments listed herein. Further, the distributed network environment 300 presented herein may be used in any desired environment.

The distributed network environment 300 includes a plurality of devices that may be used to transmit a packet, e.g., see a first router device 302, a second device 308 at a location not local to a source of the packet (which may be a source of the packet), a third router device 304, a fourth router device 306, a fifth network device 310, and a sixth router device 312.

A carbon emission map 314 (also referred to herein as an OMSM) that incorporates predicted carbon emissions may be generated. It may be noted that the carbon emission map 314 is shown to be in the form of a table in FIG. 3, while in other approaches herein, carbon emission maps be geographical maps. Entries within the carbon emission map 314 detail information for each of the devices. For example, for each device (identified within the carbon emission map 314 by RouterID), the carbon emission map 314 details neighboring devices, e.g., see NeighborID, predicted carbon emissions (see Emissions), and costs associated with use of the device to transmit a packet, e.g., see Cost. In some illustrative approaches, techniques including Open Shortest Path First (OSPF) may be used to discover the devices as neighbors of a source within the distributed network environment 300. An individual row 316 of the carbon emission map 314 is associated with one of the devices, e.g., see fourth router device 306. This information may be used to determine which of the devices to use for transmitting the packet.

In some approaches, the carbon emission map may be, at least initially, populated based on weather predictions. Thereafter, predicted carbon emission characteristics determined based on information obtained from monitoring tools for carbon emission may be incorporated into the carbon emission map, e.g., such as predicted costs (costs for longer hops may be relatively greater than costs for shorter hops). Exceptions of the route path of the packet (e.g., IDs and/or types of devices that are to be excluded from the determining relatively low carbon emission transmission route) may be determined and defined within the carbon emission map, e.g., such as based on an application's NFR. For example, such potential routes may be noted in a predetermined color, e.g., red route line. The carbon emission map is, in some approaches, also adjusted based on the real-time inputs, e.g., weather change observed every hour may redefine path representations within the carbon emission map. An originating router is also able to specify the path or ability for intermediary routers to specify the path, in some approaches.

Within the distributed network environment 300, the carbon emission map 314 may, in some approaches, be inbuilt within one of the router devices which interfaces with a weather map. While determining a relatively low carbon emission transmission route for the first packet along a source to a target carbon emission costs, e.g., a net amount of carbon emissions, the governmental tax for emitting such emissions, etc., may be determined based on the number of proposed connections. In some approaches, connectivity limitations may additionally and/or alternatively be factored into this cost assessment, e.g., a check may be performed to determine whether a L3 router is limited by the number of Transmission Control Protocol/Internet Protocol (TCP/IP) connections and/or User Datagram Protocol (UDP) ports, etc.

Figure 4:
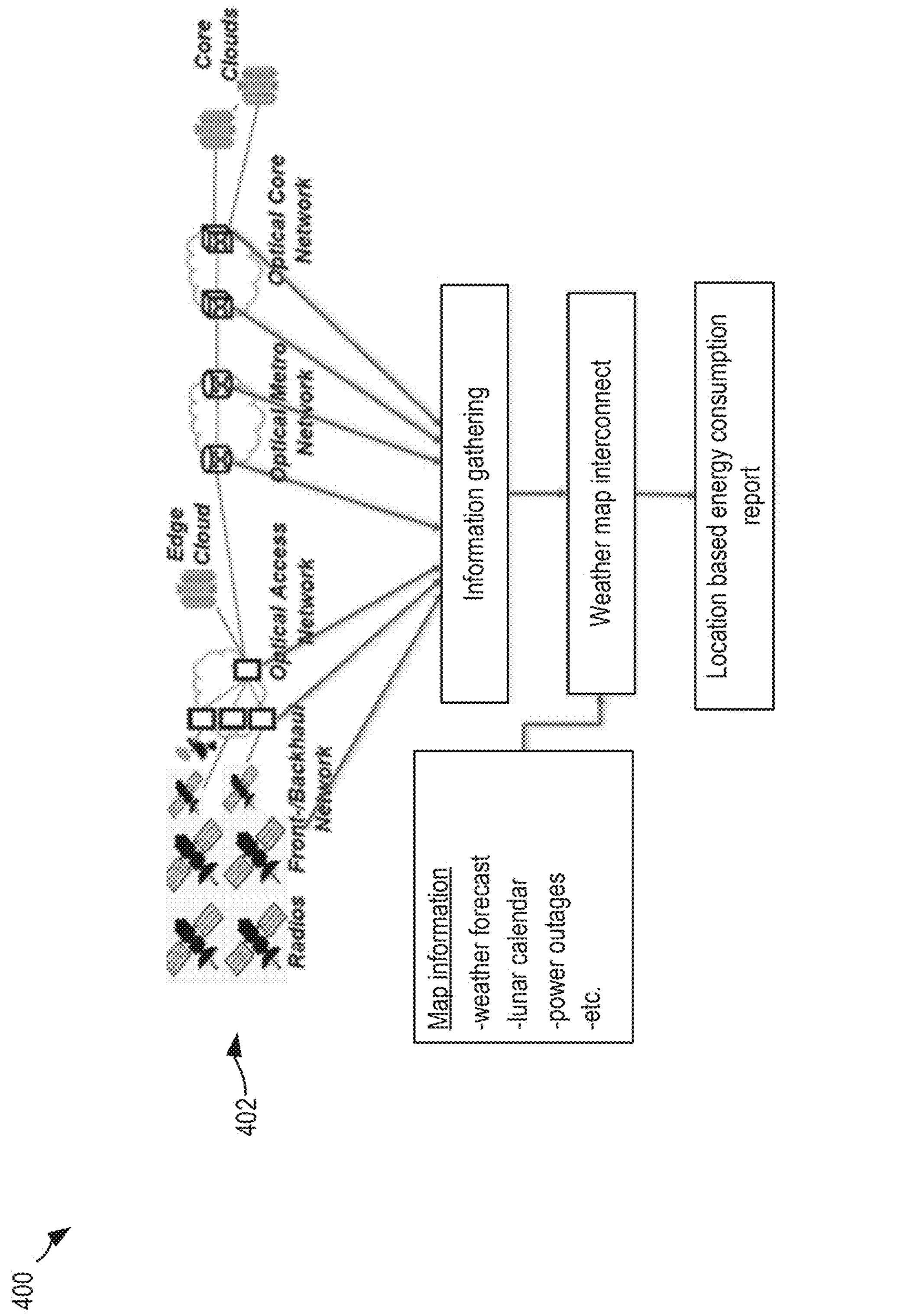
FIG. 4 is a representational view of a distributed network environment, in accordance with one embodiment of the present invention.

FIG. 4 depicts a distributed network environment 400, in accordance with one embodiment. As an option, the present distributed network environment 400 may be implemented in conjunction with features from any other embodiment listed herein, such as those described with reference to the other FIGS. Of course, however, such distributed network environment 400 and others presented herein may be used in various applications and/or in permutations which may or may not be specifically described in the illustrative embodiments listed herein. Further, the distributed network environment 400 presented herein may be used in any desired environment.

The distributed network environment 400 includes a plurality of devices in a device field 402, e.g., radios, front/backhaul network components, optical access network components, edge cloud components, optical metro network components, optical core network components, core cloud components, etc. Information may be obtained from the device field 402, e.g., see information gathering, and used to determine which of the devices are available for being used to transmit a packet from a source to a target. A determination of a relatively low carbon emission transmission route for the packet along a source to a target may be determined and, in some approaches, this determination preferably incorporates one or more predetermined types of map information, e.g., see weather forecast, lunar calendar, and power outages, incorporated into the determination in a weather map interconnect operation. In some approaches, a location based energy consumption report may additionally and/or alternatively be used for the determination of the route for the packet.

Infrastructure associated with determining a relatively low carbon emission transmission route for a packet along a source to a target, according to some approaches, is described below.

Figure 5:
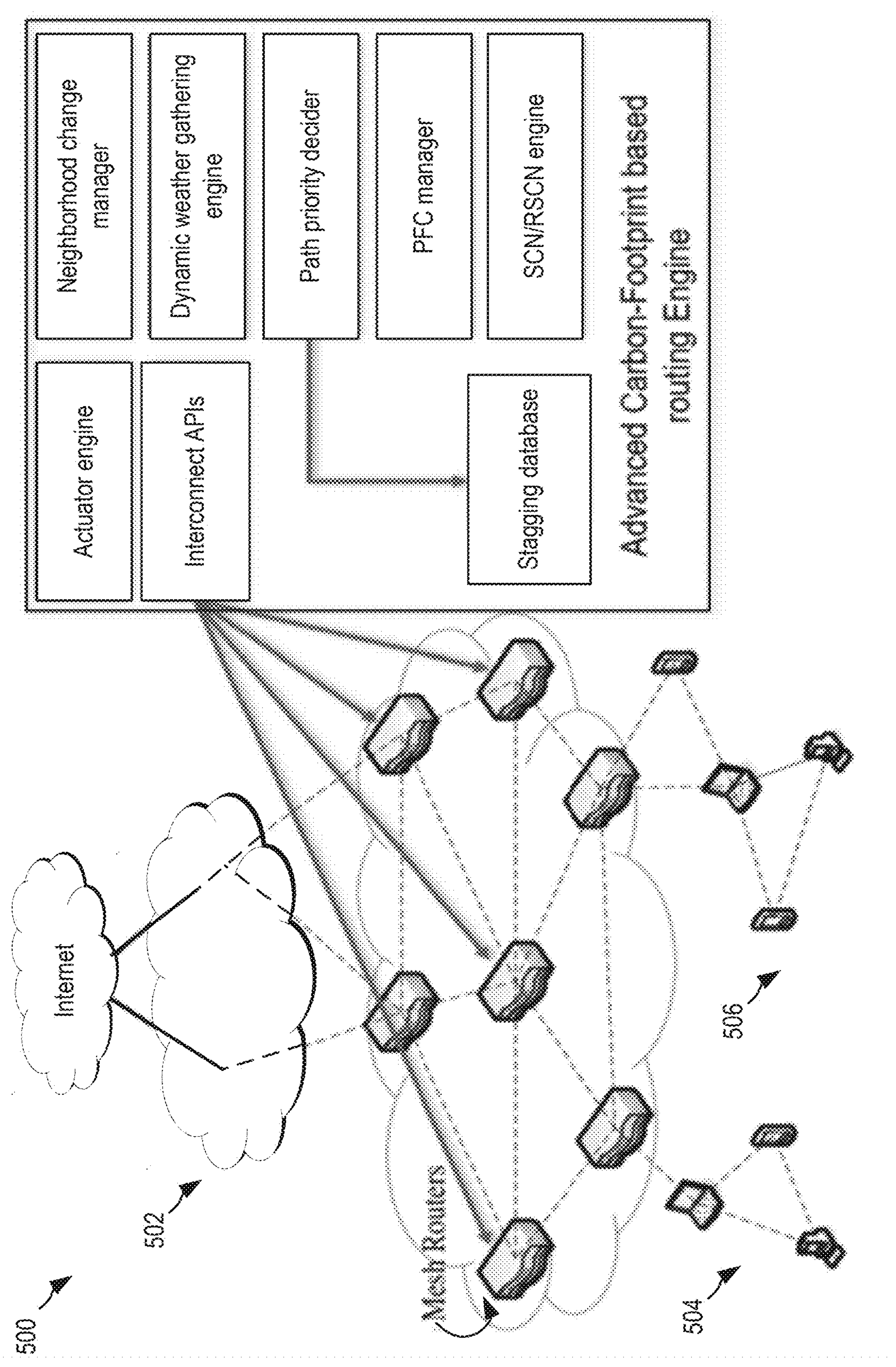
FIG. 5 is a representational view of network infrastructure of a distributed network environment, in accordance with one embodiment of the present invention.

FIG. 5 depicts network infrastructure 500 of a distributed network environment, in accordance with one embodiment. As an option, the present network infrastructure 500 may be implemented in conjunction with features from any other embodiment listed herein, such as those described with reference to the other FIGS. Of course, however, such network infrastructure 500 and others presented herein may be used in various applications and/or in permutations which may or may not be specifically described in the illustrative embodiments listed herein. Further, the network infrastructure 500 presented herein may be used in any desired environment.

The network infrastructure 500 includes a plurality of network components, e.g., see Internet, a sub-cloud network 502, mesh routers, and additional device groups 504 and 506. Furthermore, modules of an advanced carbon-footprint based routing engine may be incorporated into operations of predetermined process for determining a relatively low carbon emission transmission route for a first packet along a source to a target of the network infrastructure. It should be noted that, in the process of the packet being routed down a path in the network, the packet may be routed to different intermediate hops, switches and other components. The packet contributes to energy consumption by the device, environmental factors, and some of the devices of the network infrastructure may be relatively inefficient in handling packets, and thereby be prone to relatively more carbon emission. Accordingly, the techniques described herein, e.g., see method 200, may be performed in the network infrastructure to determine which path is relatively energy efficient. Furthermore, in response to a determination that a packet is non-mission critical (does not have a deadline that would otherwise prevent a determined relatively efficient path to be used), the packet may be routed to a path determined to be relatively energy efficient. This way, less carbon is released into the atmosphere and effective packet routing is achieved. Details for each of the modules of the advanced carbon-footprint based routing engine are described below.

An actuator engine module of the advanced carbon-footprint based routing engine is one of a plurality of routing entries of the switches and the networking components which have more input and more output paths. This module is configured to understand enablement and/or disablement of a predetermined routing method and trigger the routing of packets on a selected path. The actuator engine has two primary actions, e.g., decoding PCP values and looking at the PCP, mapping them with priorities and selecting a path to send the packet.

A neighborhood change manager module initiates discovery and re-discovery of neighbors (neighboring devices) by gathering all the information about neighboring entities which can be added into a routing table of a switch and/or network device. To initiate discovery, the module uses polling and interrupt driven approaches. In polling approaches, the discovery engine continues polling for the neighbor after certain time intervals for the state change and enquires the data in every iteration. In some interrupt driven approaches, the target sends and interrupts in response to a determination that any configuration change is made, and rediscovery is triggered. This further implements dynamic routing policies based on PCP for criticality of the processing and obtains data in case some of the intermediate devices are not available. In cases of unavailability, re-discovery of the paths is attempted based on carbon contribution.

An interconnect APIs module are the program interfaces, which may be protocol based in-band APIs or external out of band APIs for message exchange. The module is configured to obtain the status of the execution on different devices.

A dynamic weather gathering engine module, in some approaches, includes a polling thread ( ) function that is executed on all the target locations of devices and determines the external temperature and other information at a centralized location of the devices. Optionally, this information can be enquired from a centralized location by sending the latitude-longitude information for all the participating networking entities so that external temperatures can be determined. External temperature contributes to carbon footprint when considered with heat dissipation. For example, if an external temperature is forty-five degrees and a device is generating more heat, more air conditioning power may be expended to drop the equipment into an acceptable temperature range.

The engine of the dynamic weather gathering engine module furthermore gatherers map information according to a predefined interval, determines a pattern of the information, saves the pattern and information in a stagging database, estimates when an outer temperature will increase so that the packets can avoid that path at the estimated time (and vice versa with respect to cooling), etc.

A path priority decider module is configured to avoid re-computation of better paths from all available live paths. Caching may be made for better paths by considering determined priority ordering. For example, there can be multiple paths from location 1 to 2, however there may be three paths which are energy efficient, four that are moderate, and two that are carbon heavy. This information is, in some approaches, preferably determined and saved in cache memory to ensure that the decision for the determined path of every packet is uniquely determined and thereby cannot all be routed to the same path. This further helps in avoiding frequent flip-flops between the determined paths due to workloads. Accordingly, this module takes the packet transmission into account to ensure that packet do not cause a given path to become congested while other paths are free and available.

The PFC manager module manages priority flow control for incoming and outgoing packets. The packets are scanned for their priority and flow control configurations which may be derived from spanning tree protocols between the cascading neighbor devices. Accordingly, the lossless transmission may be ensured by regulating traffic flows to avoid dropping frames during times of congestion. This further controls the flow of packets by pausing and restarting the flow control, and prevents buffers on the targets from overflowing and dropping frames. The class of service (CoS) values are defined in the flow control statistics which enables the division of traffic into classes and sets various levels of throughput and packet loss when congestion occurs. This is used to route the traffic of packets, and to understand which green paths are becoming overloaded in order to balance flows across the system.

The SCN/RSCN engine module handles the SCN and RSCN between the communicating entities including TCP/IP connections and channels created between the networked entities. The module obtains updates with SCN when a new TCP/IP connection is made or altered. This information is then transferred to PFC manager to obtain the flow and priority alignment so that the incoming packets on the tunnel can be transferred correctly. This further enables handshakes using OSPF for a routing table for neighbor devices to understand the possible routes between the endpoints (the source and target).

Figure 6:
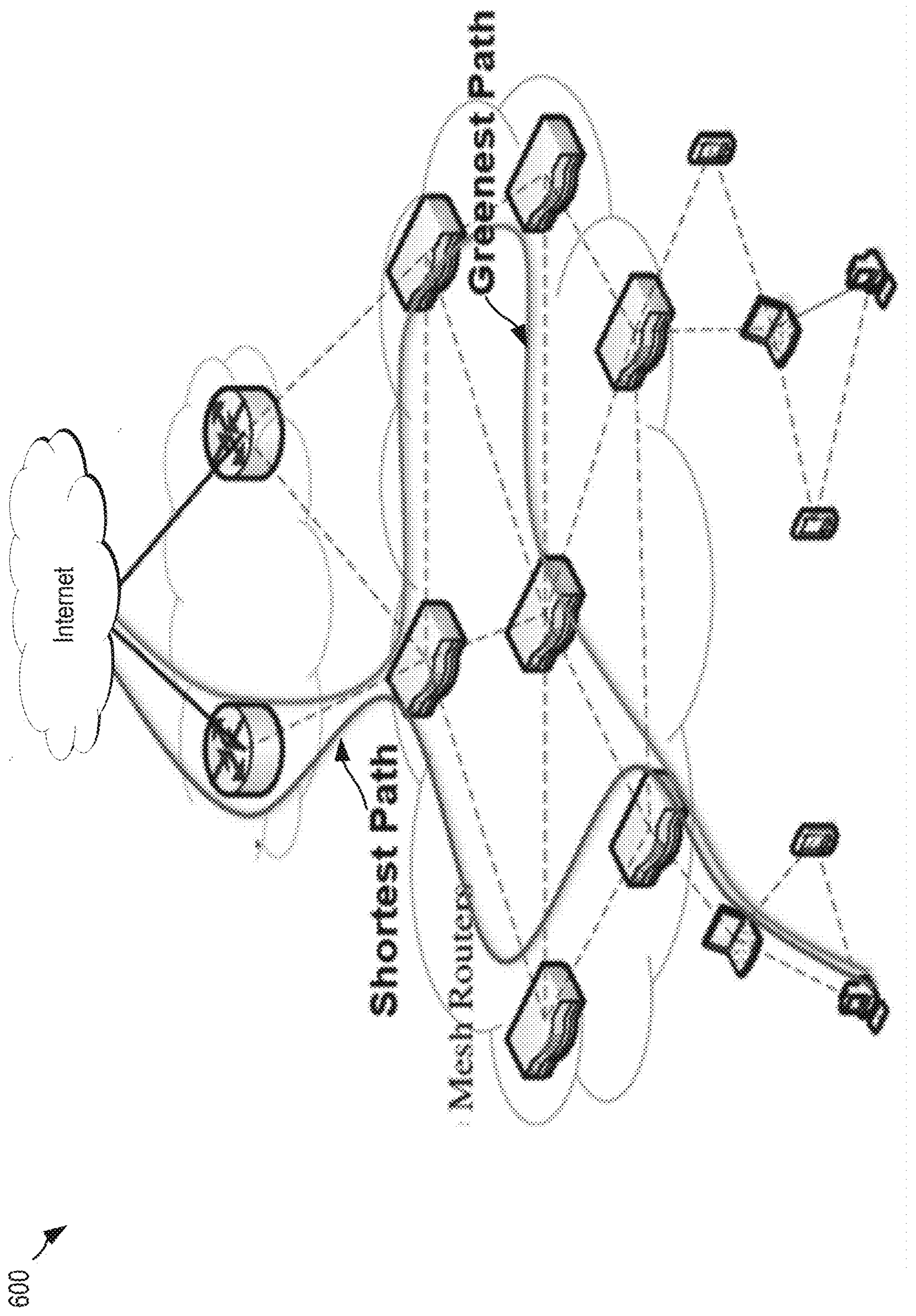
FIG. 6 is a representational view of a distributed network environment, in accordance with one embodiment of the present invention.

FIG. 6 depicts a distributed network environment 600, in accordance with one embodiment. As an option, the present distributed network environment 600 may be implemented in conjunction with features from any other embodiment listed herein, such as those described with reference to the other FIGS. Of course, however, such distributed network environment 600 and others presented herein may be used in various applications and/or in permutations which may or may not be specifically described in the illustrative embodiments listed herein. Further, the distributed network environment 600 presented herein may be used in any desired environment.

Operations of a method are performed within the distributed network environment 600 for performing a predetermined process for determining a relatively low carbon emission transmission route for the first packet along a source to a target. The method may, in some approaches, be initiated by a centralized orchestrator or a distributed orchestrator unit where a data structure loading occurs from configuring parsing methods. Persistent configuration file parsing may be performed and metadata mapper classes may be loaded to initiate reactors. A monitoring engine may then be initiated to collect statistics. The monitoring engine may then be caused to gather source information from loaded metadata mapper classes and initiate discovery to all the components listed in a predetermined list, e.g., VALID_LIST[ ].

An agent running in a data center and outside networking devices running side the equipment may be caused to start a poll (REQ_HANDLER) for an incoming request. In response to any incoming request being received, the agent processor decodes the PDU processing and then updates the initiator about source carbon footprint information along with the source location.

To gather the carbon and energy requirements for the equipment, attachment of target temperature and overall watt consumption may be gathered from system resources and supplied as part of a discovery response. This may trigger OSPF based discovery of neighbors.

The method further integrates packet route table information to understand the intermediate hops being used by the packet flow from application to a target location. This step may further locate an L3 router via in-bound APIs with the weather map. This may be applied using route add entries for specific application packet IP address fields and based on this, the routing may, in some approaches, be made aware about location intelligence for packet flow.

Once the route table information is known, the process further initiates discovery to all intermediate hops where the packet processing is made and active CPU information is gathered. This may include temperature statistics and carbon emission statistics using watt usage and cooling requirements analysis by weather. The stats are collected and saved into metadata mappers in the orchestrator which are then used for calculating an optimized path for the packet workflow. The optimized energy efficiency maps are preferably calculated between the route entries generated at the source level. Furthermore, the carbon emission map is populated based on the weather predictions and predictive carbon emission characteristics determined by monitoring tools for carbon emission including the costs.

The optimized map generation may be re-triggered based on SCN/RSCN approaches to enable the dynamic availability of the efficient map. This may include adjusting the carbon emission map based on the real-time inputs, e.g., weather change observed every hour which may redefine one or more paths. When any packet is sent by the application over the network, the packets are initially decoded to understand priority flow values of the packet. In some approaches, PCP tags are decoded, and information is be supplied to the orchestrator engine to understand the route utilization for upcoming hops.

The PCP tags are, in some approaches, received by the orchestrator and may be matched by applications priority entities. In some approaches, in response to a determination that the PCP value is mapping to a non-mission critical workload, the engine may be caused to respond to the first hope with a message about the findings, e.g., NON_CRITICAL_PATH_ACTIVE. In response thereto, the decision is recorded by keeping <application ID, PCP> pair locally and updating the route entries for these application traffic according. This information is then populated to other hops for <application ID, PCP> values and a next hop then updates the information to route the further incoming packets in the network. This information and path will be saved as a GREEN_ROUTE into the network, e.g., see Greenest Path which is determined to be a relatively most efficient route and may be different than a Shortest Path.

The changes in real time consumption of energy utilization of intermediate components may trigger SCN/RSCN, and the GREEN_MAP retriggering will as a result be initiated. The packet then flows via an alternate GREEN_ROUTE which consumes less energy for overall transmission.

In some approaches in which the PCP tags are detected as MISSION_CRITICAL, the engine informs a first hop (a first device of mesh routers of the route) to leverage existing best pathing algorithms and a GREEN_ROUTE is bypassed as the green path may contain more end-too-end latency. The exceptions of the route path of the packet based on the application's NFR may be made.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM), the CIM comprising:

in response to receiving a first packet from a first application, performing a predetermined process for determining a relatively low carbon emission transmission route for the first packet along a source to a target, wherein the predetermined process includes:

predicting for each of a plurality of devices between the source and the target, carbon emissions that would result from using the device for transmitting the first packet, generating a carbon emission map that incorporates the predicted carbon emissions, identifying a service level agreement (SLA) that applies to the first packet, wherein the SLA defines a plurality of non-functional requirements (NFRs) that apply to transmission of the first packet, wherein the NFRs that apply to the transmission of the first packet are decoded from a priority flow control (PFC) and class of service (CoS) values coming from incoming packets including the first packet, and selecting, from the carbon emission map, a first transmission route for the first packet, wherein the first transmission route hops along at least one of the devices, wherein the first transmission route is selected over a second transmission route for the first packet based on the second transmission route having a relatively greater carbon emission than the first transmission route and based on the second transmission route not satisfying the SLA that applies to the first packet, wherein the SLA has a relatively higher priority than carbon emissions in the selection of the first transmission route for the first packet; and causing the first packet to be transmitted from the source to the target along the first transmission route.

2. The CIM of claim 1, wherein the first packet is received at a first router, wherein the devices are selected from the group consisting of: a router, a desktop computer, a laptop computer, a smart phone, a network switch, and a server.

3. The CIM of claim 1, wherein the predetermined process includes: querying availability for discovering the plurality of devices between the source and the target.

4. The CIM of claim 1, wherein the predetermined process includes: dynamically updating the carbon emission map as conditions that have a potential for changing the predicted carbon emissions occur, wherein the carbon emission map includes a plurality of graphical icons that represent the plurality of devices, wherein the graphical icons are color coordinated according to amounts of carbon that the associated devices are predicted to output by transmitting the first packet such that different predetermined ranges of predicted carbon emissions are assigned to the different colors of the graphical icons within the generated carbon emission map.

5. The CIM of claim 4, wherein the conditions are selected from the group consisting of: a change in a predicted weather pattern at a geographical location of one of the devices, a predetermined amount of time passing, and at least one of the devices going offline.

6. The CIM of claim 1, wherein the NFRs are selected from the group consisting of: a maximum amount of latency, minimum transmission speeds of the first packet, and security requirements for devices used to transmit the first packet.

7. The CIM of claim 6, wherein the first transmission route is selected over the second transmission route for the first packet based on the first transmission route satisfying the SLA that applies to the first packet.

8. The CIM of claim 7, wherein a third transmission route for the first packet has a relatively lesser carbon emission than the first transmission route, wherein the first transmission route is selected over the third transmission route for the first packet based on the third transmission route not satisfying the SLA that applies to the first packet, and comprising: modifying the priority with respect to the SLA and the carbon emissions according to global warming reports and according to changes of seasons throughout a year.

9. The CIM of claim 1, wherein the first packet specifies a first of the devices that is to be used for transmitting the first packet, wherein the first transmission route is selected based on the first transmission route including the first device.

10. A computer program product (CPP), the CPP comprising:

a set of one or more computer-readable storage media; and program instructions, collectively stored in the set of one or more storage media, for causing a processor set to perform the following computer operations:

in response to receiving a first packet from a first application, perform a predetermined process for determining a relatively low carbon emission transmission route for the first packet along a source to a target, wherein the predetermined process includes:

predicting for each of a plurality of devices between the source and the target, carbon emissions that would result from using the device for transmitting the first packet, generating a carbon emission map that incorporates the predicted carbon emissions, identifying a service level agreement (SLA) that applies to the first packet, wherein the SLA defines a plurality of non-functional requirements (NFRs) that apply to transmission of the first packet, wherein the NFRs that apply to the transmission of the first packet are decoded from a priority flow control (PFC) and class of service (CoS) values coming from incoming packets including the first packet, and selecting, from the carbon emission map, a first transmission route for the first packet, wherein the first transmission route hops along at least one of the devices, wherein the first transmission route is selected over a second transmission route for the first packet based on the second transmission route having a relatively greater carbon emission than the first transmission route and based on the second transmission route not satisfying the SLA that applies to the first packet, wherein the SLA has a relatively higher priority than carbon emissions in the selection of the first transmission route for the first packet; and cause the first packet to be transmitted from the source to the target along the first transmission route.

11. The CPP of claim 10, wherein the first packet is received at a first router, wherein the devices are selected from the group consisting of: a router, a desktop computer, a laptop computer, a smart phone, a network switch, and a server.

12. The CPP of claim 10, wherein the predetermined process includes: querying availability for discovering the plurality of devices between the source and the target.

13. The CPP of claim 10, wherein the predetermined process includes: dynamically updating the carbon emission map as conditions that have a potential for changing the predicted carbon emissions occur, wherein the carbon emission map includes a plurality of graphical icons that represent the plurality of devices, wherein the graphical icons are color coordinated according to amounts of carbon that the associated devices are predicted to output by transmitting the first packet such that different predetermined ranges of predicted carbon emissions are assigned to the different colors of the graphical icons within the generated carbon emission map.

14. The CPP of claim 13, wherein the conditions are selected from the group consisting of: a change in a predicted weather pattern at a geographical location of one of the devices, a predetermined amount of time passing, and at least one of the devices going offline.

15. The CPP of claim 10, wherein the NFRs are selected from the group consisting of: a maximum amount of latency, minimum transmission speeds of the first packet, and security requirements for devices used to transmit the first packet.

16. The CPP of claim 15, wherein the first transmission route is selected over the second transmission route for the first packet based on the first transmission route satisfying the SLA that applies to the first packet.

17. The CPP of claim 16, wherein a third transmission route for the first packet has a relatively lesser carbon emission than the first transmission route, wherein the first transmission route is selected over the third transmission route for the first packet based on the third transmission route not satisfying the SLA that applies to the first packet, and the program instructions, collectively stored in the set of one or more storage media, for causing the processor set to perform the following computer operations: modifying the priority with respect to the SLA and the carbon emissions according to global warming reports and according to changes of seasons throughout a year.

18. The CPP of claim 10, wherein the first packet specifies a first of the devices that is to be used for transmitting the first packet, wherein the first transmission route is selected based on the first transmission route including the first device.

19. A computer system (CS), the CS comprising:

a processor set;

a set of one or more computer-readable storage media; and program instructions, collectively stored in the set of one or more storage media, for causing the processor set to perform the following computer operations:

in response to receiving a first packet from a first application, perform a predetermined process for determining a relatively low carbon emission transmission route for the first packet along a source to a target, wherein the predetermined process includes:

predicting for each of a plurality of devices between the source and the target, carbon emissions that would result from using the device for transmitting the first packet, generating a carbon emission map that incorporates the predicted carbon emissions, identifying a service level agreement (SLA) that applies to the first packet, wherein the SLA defines a plurality of non-functional requirements (NFRs) that apply to transmission of the first packet, wherein the NFRs that apply to the transmission of the first packet are decoded from a priority flow control (PFC) and class of service (CoS) values coming from incoming packets including the first packet, and selecting, from the carbon emission map, a first transmission route for the first packet, wherein the first transmission route hops along at least one of the devices, wherein the first transmission route is selected over a second transmission route for the first packet based on the second transmission route having a relatively greater carbon emission than the first transmission route and based on the second transmission route not satisfying the SLA that applies to the first packet, wherein the SLA has a relatively higher priority than carbon emissions in the selection of the first transmission route for the first packet; and cause the first packet to be transmitted from the source to the target along the first transmission route.

20. The CS of claim 19, wherein the first packet is received at a first router, wherein the devices are selected from the group consisting of: a router, a desktop computer, a laptop computer, a smart phone, a network switch, and a server.

* * * * *